(No Model.)
M. R. WOOD.
MANUFACTURE OF BICARBONATE OF SODA.
No. 384,884. Patented June 19, 1888.
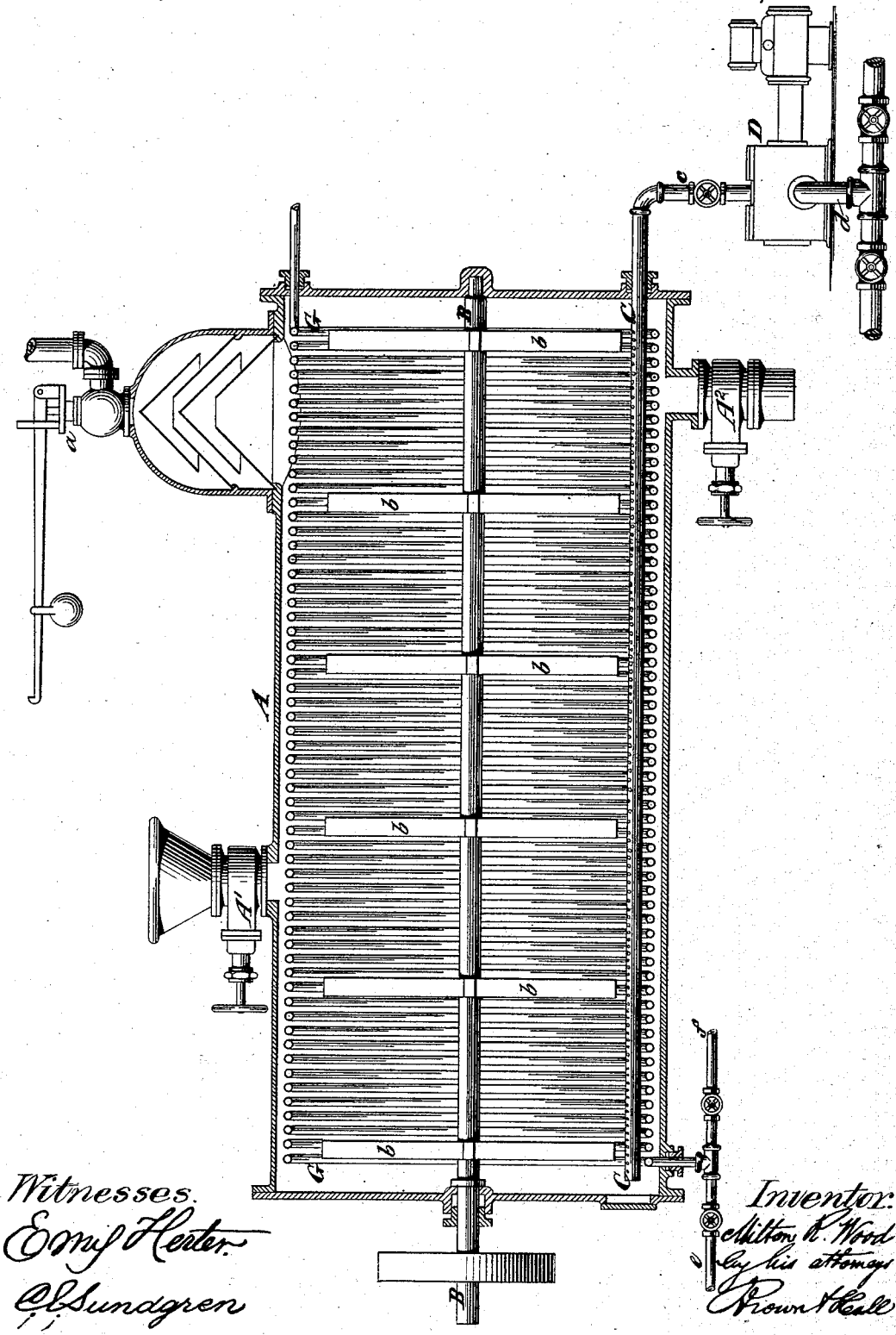

UNITED STATES PATENT OFFICE.

MILTON R. WOOD, OF BROOKLYN, NEW YORK.

MANUFACTURE OF BICARBONATE OF SODA.

SPECIFICATION forming part of Letters Patent No. 384,884, dated June 19, 1888.

Application filed November 30, 1886. Serial No. 220,244. (No specimens.)

*To all whom it may concern:*

Be it known that I, MILTON R. WOOD, of the city of Brooklyn, in the county of Kings and State of New York, have invented a new and useful Improvement in the Manufacture of Bicarbonate of Soda, of which the following is a specification, reference being had to the accompanying drawing.

This invention relates particularly to the purifying of the bicarbonate of soda obtained by what is known as the "ammonia-soda process." The bicarbonate of soda in the crude condition in which it is thus obtained is not suitable for manufacturing purposes or domestic use by reason of the impurities contained therein, consisting, generally, of compounds of ammonia or of impurities inherent in the ammonia originally used, probably due to the source whence that ammonia was obtained. I have discovered that by taking this crude bicarbonate of soda, mixing the same with water, and heating the mixture to a temperature of from 190° to 210° Fahrenheit, under a pressure of about from thirty-five to fifty pounds per square inch, produced by forcing air into and through it, the bicarbonate is purified and fit for all the purposes for which bicarbonate of soda may be used.

My invention consists, principally, in the practical application of the above discovery, as hereinafter described and claimed, to the purpose of purifying the crude bicarbonate, and, further, in the method of cooling the purified product, whereby I at the same time replace any carbonic acid that might have been driven off by such purification.

The accompanying drawing represents a vertical section of an apparatus which may be employed in carrying out my invention.

A designates a vessel of horizontal, cylindrical, or other form, fitted with a loaded safety-valve, $a$, whereby a proper pressure may be regulated therein, and also fitted with a rotary agitator, B $b$. The said vessel is also furnished with a steam-coil or water-coil, G, for heating the contents, and fitted with a perforated pipe, C, which is connected with the delivery-pipe $c$ of a compressor, D, the suction-pipe $d$ of which has provision for receiving air or carbonic acid at pleasure to be forced through the perforated pipe C into and through the contents of the vessel A. The coil G is represented as connected with a pipe, $e$, for the supply of hot water or steam for heating the contents of the vessel, and with a pipe, $f$, for cooling the said contents, each of the said pipes being fitted with a stop-cock, by which it may be closed or opened while the other is open or closed. The said vessel is also provided with suitable inlet and outlet valves or gates, $A'$ $A^2$, for filling and discharging.

To carry out my process the agitator is first started, and the vessel is then filled to, say, about three-fourths of its depth (more or less) with a mixture of the crude bicarbonate, with sufficient water to give the mass a semi-fluid or cream-like consistency, and is then closed tightly, and steam or hot water is then introduced from the pipe $e$ through the coil to bring the mixture to a temperature of, say, from 190° to 210° Fahrenheit, after which I force air through the perforated pipe C into and through the mixture, creating and maintaining a pressure of about thirty-five to fifty pounds per square inch by properly adjusting the load of the safety-valve and allowing the exit of the air as freely as it enters the vessel. This forced circulation of air and heating of the vessel may be continued for a time, varying according to the quantity of material operated on—say from fifteen minutes to three hours. The air thus forced through the mixture acts as an oxidizing agent upon any oxidizable matters present therein, and also as an agent for removing and carrying off any impurities of a volatile nature that may be contained in the bicarbonate and vaporized by the action of the heat and air.

After the purification in the above manner has been completed, the temperature of the mixture in the vessel is reduced to about the temperature of the atmosphere, which may be done by shutting off the pipe $e$ from the coil and opening the pipe $f$ to admit cold water thereto. After the cooling has been effected the air may be shut off from the pump and carbonic acid be forced through the perforated pipe C for the purpose of replacing any carbonic acid that may be driven off from the bicarbonate in the purification. This carbonic acid so used may be what has been previously driven off in the purifying process or obtained from any other source. The process having been thus completed, the bicarbonate of soda free from ammonia may be discharged from the vessel A, and the bicarbonate may afterward be freed from the water by any of the known or suitable methods of hydro-extraction, to be dried and prepared as desired for use.

What I claim as my invention, and desire to secure by Letters Patent, is—

1. The within-described improvement in the purification of the crude bicarbonate of soda obtained by the ammonia process, consisting in mixing said crude bicarbonate with sufficient water to make a mixture of a semi-fluid or cream-like consistency, and heating the said mixture to a temperature of about from 190° to 210° Fahrenheit, while it is subjected to pressure by forcing air into and through it, substantially as herein described, for the expulsion of ammoniacal impurities.

2. The within-described improvement in the manufacture of bicarbonate of soda by the ammonia process, consisting in mixing the crude bicarbonate of soda resulting directly from that process with sufficient water to make a mixture of a semi-fluid consistency, heating the said mixture to a temperature of about 190° to 210° Fahrenheit, and while so heated forcing air into or through it for the purpose of expelling the excess of ammoniacal impurities, and afterward forcing through it carbonic-acid gas for the purpose of replacing the carbonic acid which may have been driven off by the air previously forced through it, all substantially as herein described.

MILTON R. WOOD.

Witnesses:
C. HALL,
FREDK. HAYNES.